(No Model.) 3 Sheets—Sheet 2.

H. J. COLBURN.
CIRCULAR SAWING MACHINE.

No. 250,712. Patented Dec. 13, 1881.

Witnesses:
E. A. Hemmenway.
Walter C. Lombard.

Inventor:
Henry J. Colburn,
by N. C. Lombard.
Attorney.

(No Model.) 3 Sheets—Sheet 3.

H. J. COLBURN.
CIRCULAR SAWING MACHINE.

No. 250,712. Patented Dec. 13, 1881.

Witnesses:
E. A. Hemmenway
Walter E. Lombard

Inventor:
Henry J. Colburn
by N. C. Lombard
Attorney.

UNITED STATES PATENT OFFICE.

HENRY J. COLBURN, OF FITCHBURG, MASSACHUSETTS.

CIRCULAR SAWING MACHINE.

SPECIFICATION forming part of Letters Patent No. 250,712, dated December 13, 1881.

Application filed April 20, 1881. (No model.)

*To all whom it may concern:*

Be it known that I, HENRY J. COLBURN, of Fitchburg, in the county of Worcester and State of Massachusetts, have invented certain new and useful Improvements in Circular Sawing Machines, of which the following, taken in connection with the accompanying drawings, is a specification.

My invention relates to a circular sawing machine for the use of joiners, pattern-makers, and other wood-workers; and it consists in certain novel devices for facilitating the operation of the saw upon different kinds of work, which will be readily understood by reference to the description of the drawings, and to the claims to be hereinafter given.

Figure 1:
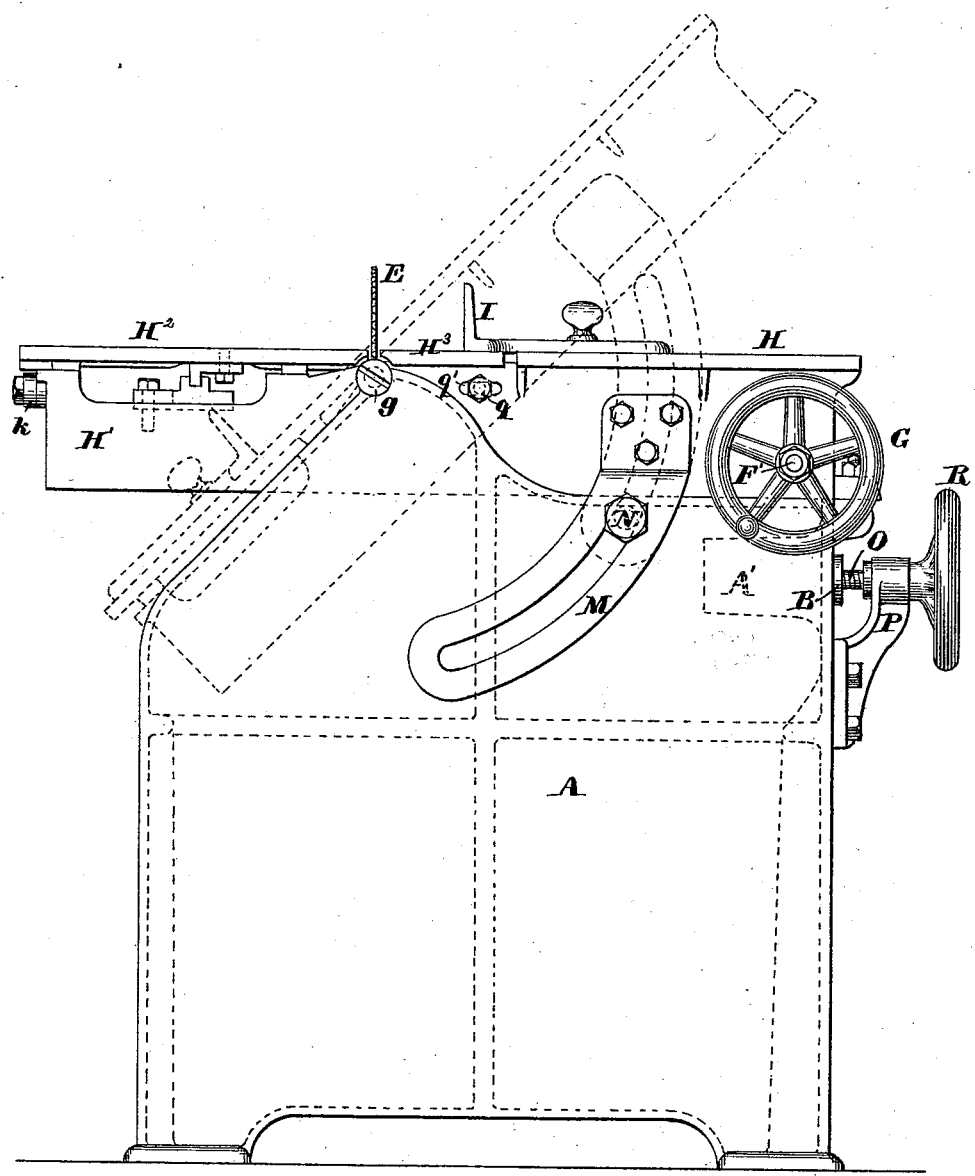
Figure 2:
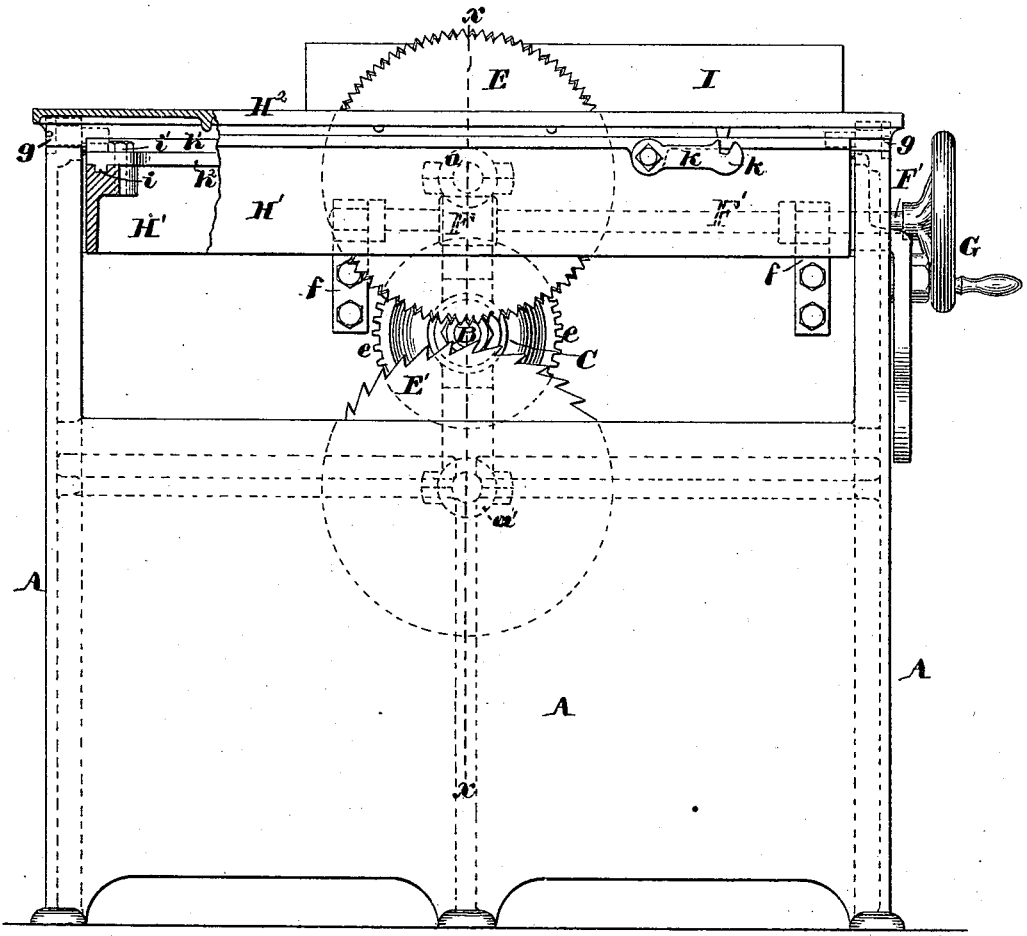
Figure 3:
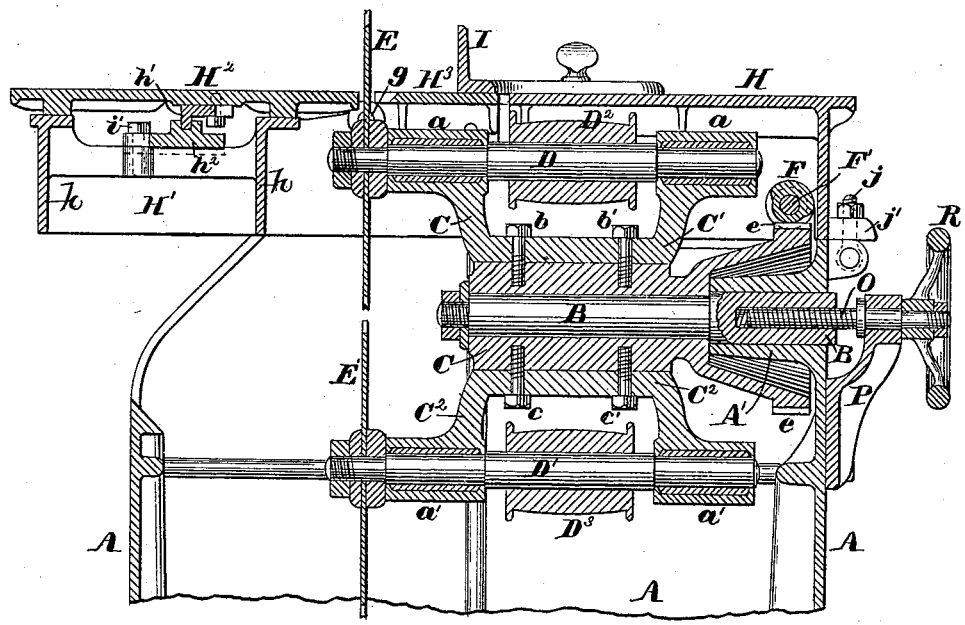
Figure 5:
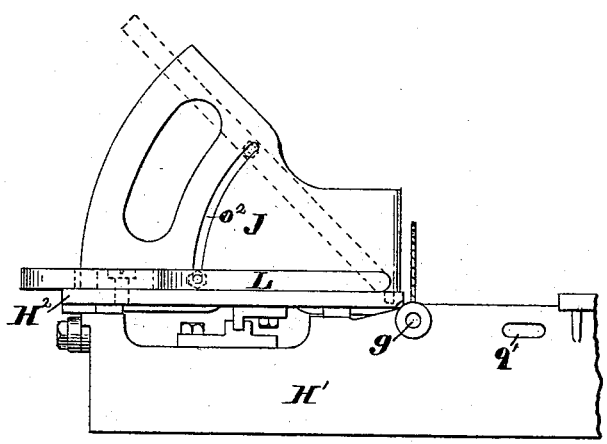
Figure 4:
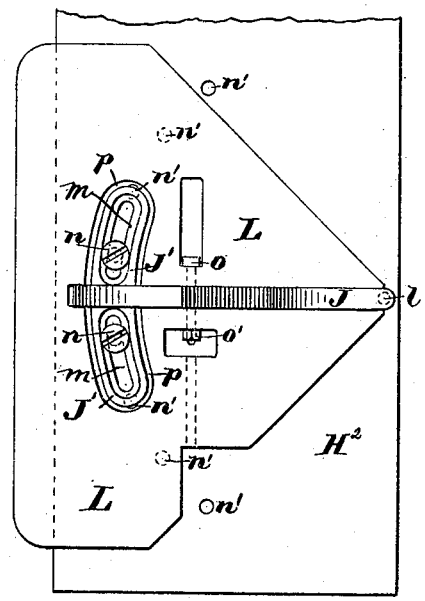

Figure 1 of the drawings is a front elevation of a machine embodying my invention. Fig. 2 is a side elevation. Fig. 3 is a partial vertical section on line $x$ $x$ on Fig. 2. Fig. 4 is a plan of my improved cutting-off gage, with a portion of the reciprocating carriage or bed. Fig. 5 is an elevation of said gage, and shows an end view of the reciprocating carriage and a portion of the tilting table; and Figs. 6, 7, 8, and 9 are details to be hereinafter referred to.

Figure 9:
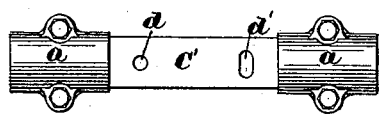

A is the main frame of the machine, made, preferably, in one piece in the form of a rectangular hollow box or casing without top or bottom, one side of which is made of considerably less height than the other three sides. Near the top of the right-hand side of said frame, and at or near the center of its width, is cast the inwardly-projecting hub A', in which is set the stud or journal B, which forms a bearing for the pivoted saw-frame, composed of the sleeve C and the yokes C' and C², secured to opposite sides of said sleeve C, and provided with the boxes $a$ and $a'$, respectively, in which are mounted the saw-arbors D and D', as shown in Fig. 3. The yokes C' and C² are attached to the sleeve C by means of the bolts $b$ and $b'$ and $c$ and $c'$, respectively, the bolts $b$ and $c$ passing through and tightly fitting in holes $d$ in the yokes C' and C², and being screwed into the sleeve C, while the bolts $b'$ and $c'$ pass through slots $d'$ in said yokes and are screwed into the sleeve C, as shown in Fig. 9, in such a manner that said yokes may be slightly adjusted about the bolts $b$ and $c$ for the purpose of bringing the saws E and E', which are mounted respectively upon the arbors D and D', into proper parallelism with the edge of the saw-table, as set forth in a previous application of mine filed in the Patent Office April 11, 1881. The sleeve C is provided at one end with an enlarged extension in the form of a hollow frustum of a cone, which surrounds and incloses the hub A', and has formed upon its periphery a series of worm-gear teeth, $e$, which engage with and are acted upon by the worm F, mounted upon the shaft F', having its bearings in the stands $f f$, bolted to the inside of the frame A, and provided at its outer end with the hand wheel or crank G, all as shown in Figs. 2 and 3.

The arbors D and D' are provided with the pulleys D² and D³, by means of which and a belt (not shown) the saw which is uppermost may be revolved.

Figure 6:
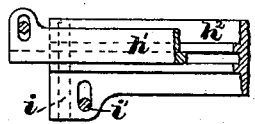

H is the main table of the machine, pivoted at $gg$ to the frame A, and adapted to be used in a horizontal position, as shown in full lines, or tilted to any desired angle from one to forty-five degrees from a horizontal position, as shown in dotted lines in Fig. 1. The frame of the table H extends beyond the pivots $g g$ and the saw E in the form of a skeleton-frame, H', having two bars, $h$ $h$, which extend longitudinally thereof, or in lines parallel with the plane of revolution of the saws, upon which rests the carriage or reciprocating table H², to the under side of which is adjustably secured the guide $h'$, which fits into a groove formed in the upper side of the bar $h^2$, which has formed upon each end thereof the downwardly-projecting rib or lip $i$ $i$, which fits into a groove formed in the front or rear bar of the frame H', within which said bar may be adjusted toward or from the saw, for the purpose of permitting the use of a thicker or thinner saw, said bar $h^2$ being secured in the desired position by the bolts $i'$, which pass through slots in said bar, as shown in Fig. 6, and screw into ears cast on the inside of frame H', as shown in Fig. 2.

Figure 8:
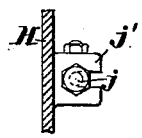
Figure 7:
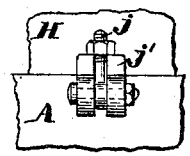

The pivoted table H may be securely locked in a horizontal position, when it is desired to saw through a piece of stock at right angles to its face, by means of the hinged bolts $j$, which engage with the slotted ears $j'$, cast upon the table H, but only one of which is shown in the drawings in Figs. 3, 7, and 8.

I is a gage of ordinary construction, to be used, as shown in full lines, when splitting stock at right angles; but when it is desired to split stock at an angle other than ninety degrees, (90°,) the gage I is placed on the left of the saw and secured to the table H², which is also secured to the frame H' by the catch k, and the table H is tilted to the desired angle, as shown in Fig. 1. For splitting lumber the saw E' is brought into working position by turning the hand-wheel G, thereby causing the saw-arbors to partially revolve about the axis of the journal B, and when brought into the desired position it is firmly held in such position by the worm F and the teeth e on the sleeve C.

It is often desirable to saw the end of the molding obliquely to its edge or side in two directions, and for that purpose I have devised the cutting-off gage illustrated in Figs. 4 and 5, in which H² is the reciprocating table, to which is pivoted, at l, the upright plate J, provided at its outer or movable end with the two ears J', in which are formed curved slots m, to receive the binding-screws n, by means of which and the holes n', formed in the table H², said plate J may be adjusted about the pivot l at any desired angle from a right angle to forty-five degrees from the plane of revolution of the saw.

L is a triangular table, having a slot cut through the greater part of its width, so as to permit the passage of the upright plate J through the same, said plate L being secured to the plate J at any desired angle, from one to forty-five degrees to a horizontal, by means of the bolt o, nut o', and curved slot o², as shown in Fig. 5, one corner of said plate being presented toward the saw, and resting at all times on the table H², as shown. The plate L has cut through it the curved slots p p, to permit its being placed in a horizontal position directly upon the table H² without interference with the ears J' of the plate J.

H³ is a removable section of the table, which is secured in the desired position when the table H is tilted, or in a horizontal position by the bolts q, which pass through slots q' in the front and rear bars of the frame H' of the table H, and screw into downwardly-projecting ears or ribs on the under side of said section H³. The section H³ may be removed by withdrawing the bolts q whenever it is desired to use the cutting-off gage for cutting stock at a bevel.

M is a slotted sector, secured at its upper end to the table H, by means of which and the binding-bolt N the table H and its frame may be secured at any desired angle to the plane of the saw, as indicated in dotted lines in Fig. 1.

The stud or journal B is nicely fitted to its bearing in the hub A', in which it is prevented from turning by a spline groove and key, (not shown,) and may be adjusted endwise in said bearing by means of the screw O, which has its bearing in the stand P, and works in a nut or female thread formed in the outer end of said stud, and is provided with the hand-wheel R, as shown in Fig. 3. By this means the saws may be readily and easily moved to a limited extent in the direction of the length of their arbors, for the purpose of sawing two or more cuts through a piece of stock to form a groove wider than the thickness of the saw.

A great advantage of having the rotating saw-frame mounted upon a stud or journal that is supported at one end only, as shown and described, is that a larger saw can be used, if desired, the periphery of which extends beyond the center of the journal, about which said saw-frame is revolved, which cannot be done when said journal has a bearing at both ends, as shown in my former application before cited, unless said bearings are of sufficient diameter to include within their peripheries both saw-arbors, which I am aware has heretofore been done; but such an arrangement is of necessity much more expensive than my present method of hanging the saw-frame, and is not so easily operated on account of increased friction due to the great size of the bearings and the additional weight of the parts. Another advantage is that the revolving saw-frame can be more readily removed, when necessary, for repairs.

What I claim as new, and desire to secure by Letters Patent of the United States, is—

1. The combination of the sleeve C, provided with the hollow frustum at one end, with the worm-gear teeth e formed thereon, the frame A, provided with the inwardly-projecting hub A', the shaft or journal B, the yokes C' and C², the saws E and E', saw-arbors D and D', and the worm F, all arranged and adapted to operate substantially as and for the purposes described.

2. In a circular sawing machine, the combination of the reciprocating table H², the pivoted upright J, the slotted triangular plate L, and means of securing said plate L to the upright J at varying angles to the top of the table H², substantially as and for the purposes described.

3. The combination, in a circular sawing machine, of the table and frame H H', the reciprocating table H², removable section H³, the upright gage-plate J, pivoted to said table H², and the slotted work-supporting plate L, adapted to be adjusted to and secured in any desired angular position relative to the top of the table H², substantially as described.

4. In a circular sawing machine, a saw-frame carrying two saws, and mounted upon and adapted to be revolved entirely around a stud or journal supported at one end only, substantially as and for the purposes described.

5. The combination of the frame A, provided with the hub A', the journal B, having its bearing in said hub, and provided with a female screw-thread in its outer end, the screw O, stand P, and a saw-frame mounted upon said journal, and carrying one or more saws, all arranged and adapted to operate substantially as and for the purposes described.

Executed at Boston, Massachusetts, this 18th day of April, 1881.

HENRY J. COLBURN.

Witnesses:
E. A. HEMMENWAY,
WALTER E. LOMBARD.